Nov. 5, 1963  R. N. CORDREY  3,109,322
POWER PLANT FOR DRILLING RIG
Filed Dec. 9, 1960  3 Sheets-Sheet 1
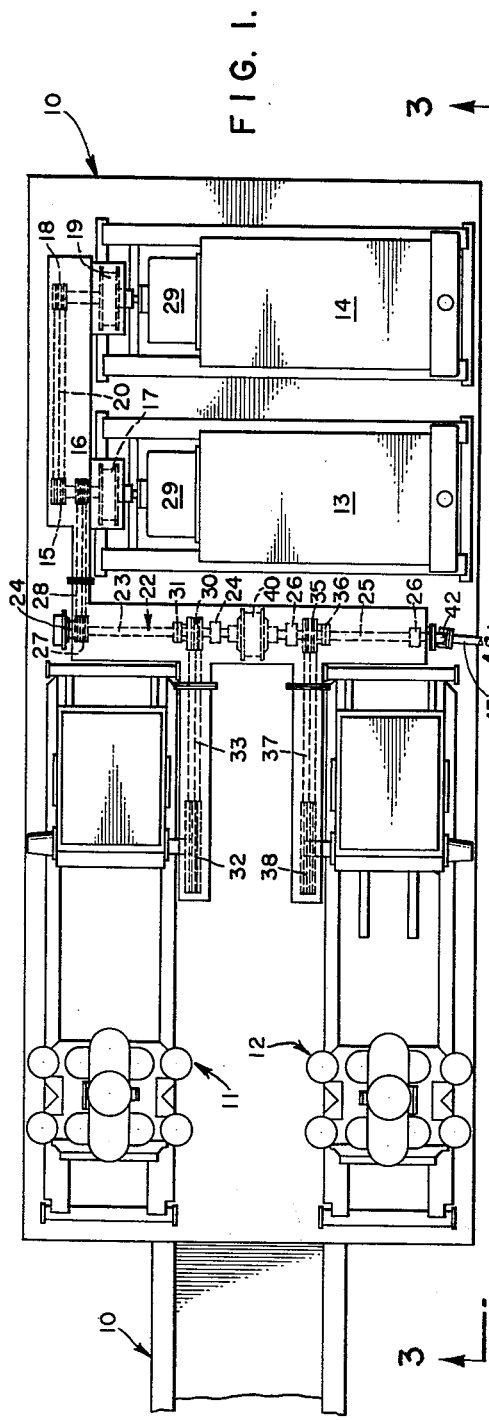
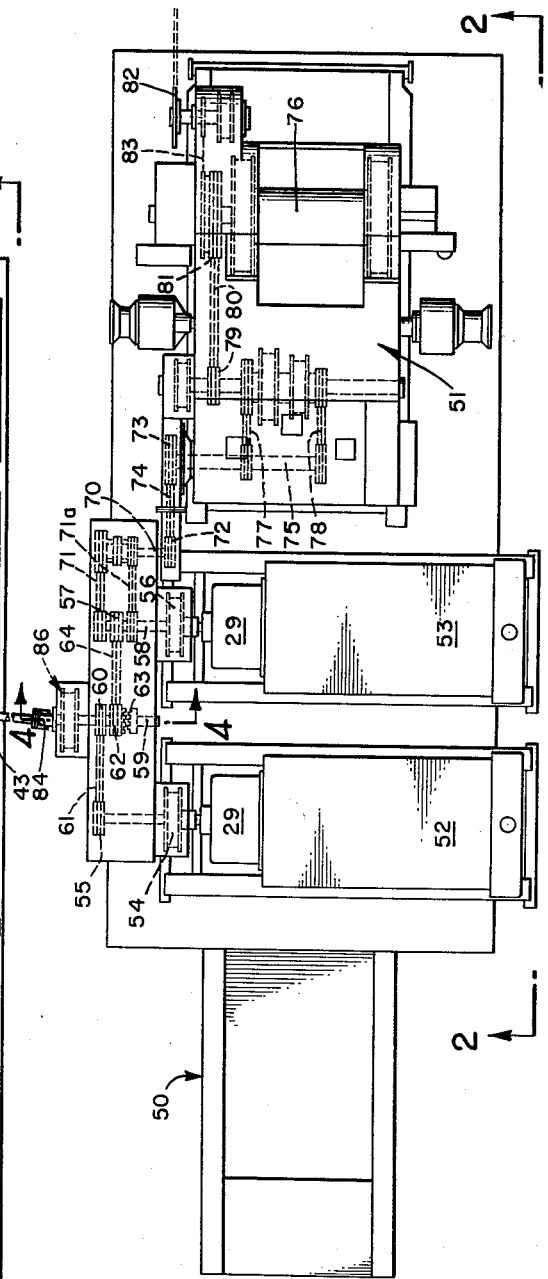
RICHARD N. CORDREY
INVENTOR.
BY *Lyon & Lyon*
ATTORNEYS Nov. 5, 1963
R. N. CORDREY
3,109,322
POWER PLANT FOR DRILLING RIG
Filed Dec. 9, 1960
3 Sheets-Sheet 2
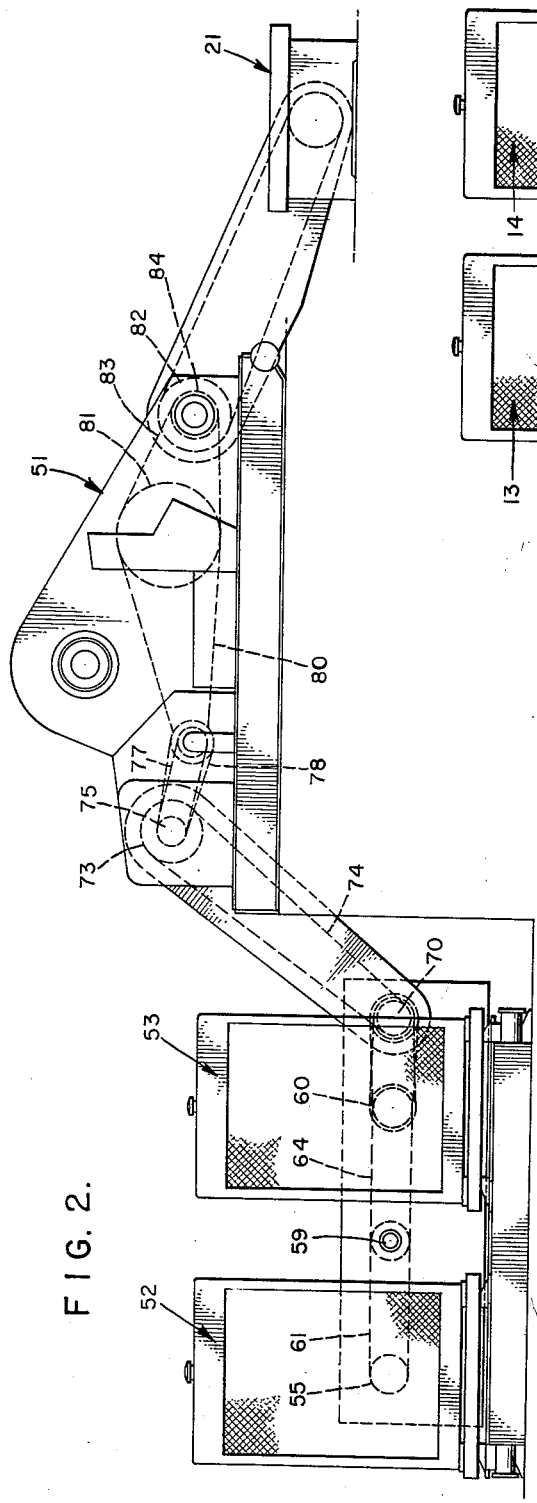
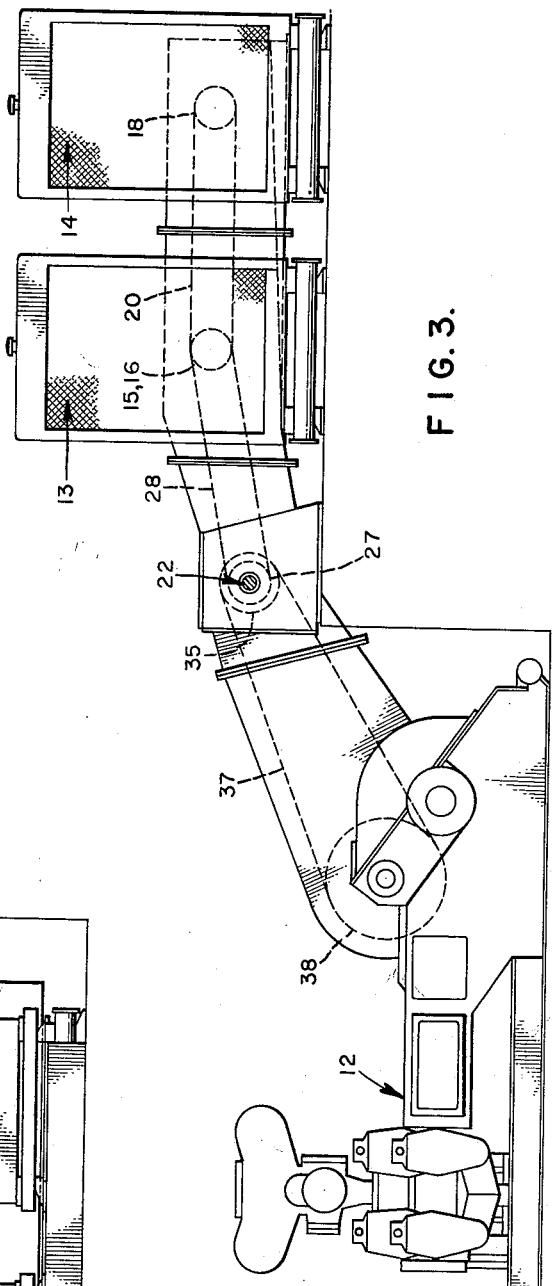
RICHARD N. CORDREY
INVENTOR.
BY
*Lyon Lyon*
ATTORNEYS

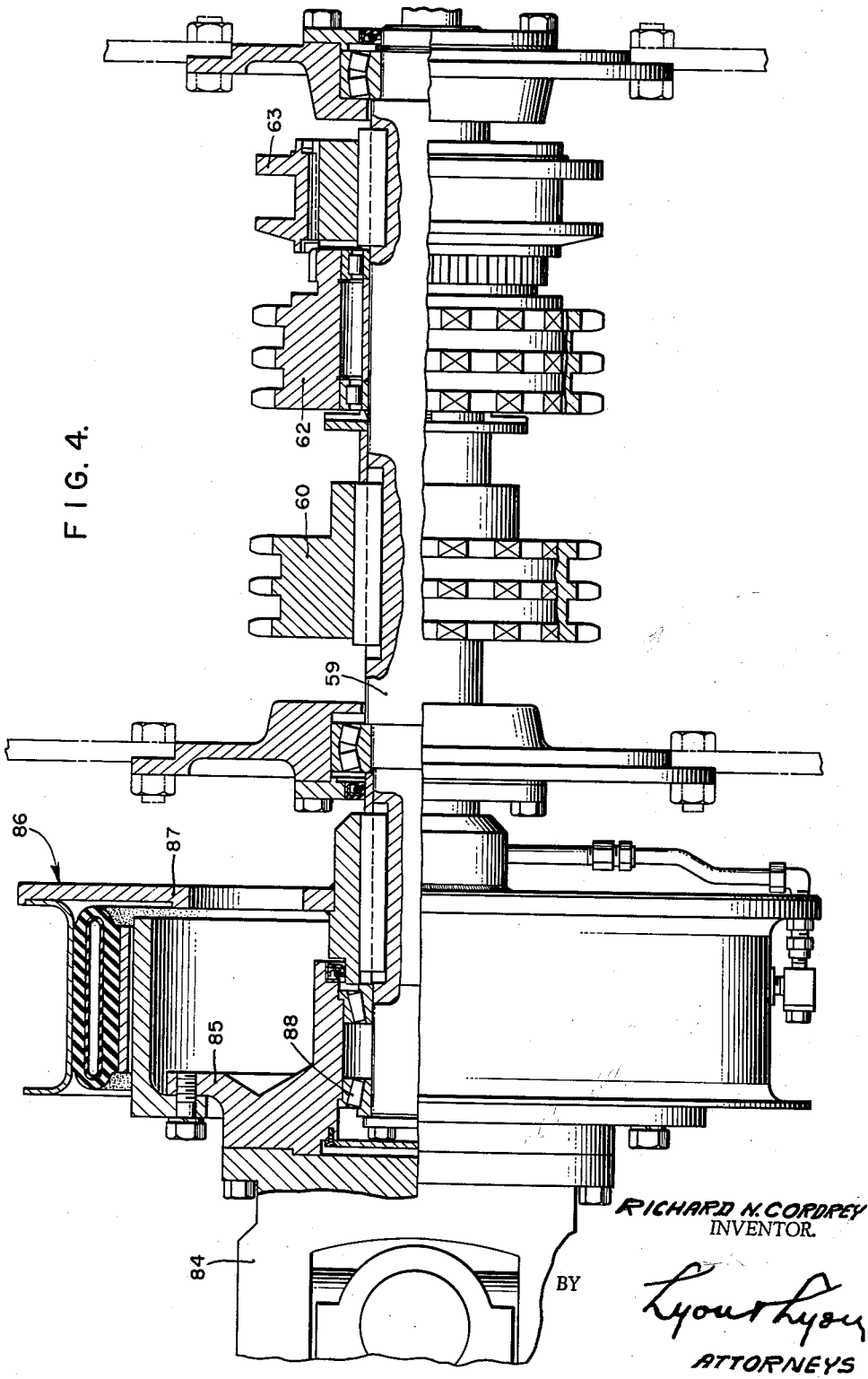

United States Patent Office 3,109,322
Patented Nov. 5, 1963

3,109,322
POWER PLANT FOR DRILLING RIG
Richard N. Cordrey, Torrance, Calif., assignor to Armco Steel Corporation, Middletown, Ohio, a corporation of Ohio
Filed Dec. 9, 1960, Ser. No. 74,910
9 Claims. (Cl. 74—661)

This invention relates to well drilling apparatus and is particularly directed to improvements in a multiple engine power plant for a drilling rig.

The principal object of this invention is to provide a power plant for a well drilling rig which rig is particularly adapted for operation in remote regions and which may be carried on mobile supports such as trailers for transport over the terrain in off-the-highway service.

Another object of this invention is to provide a well drilling rig and power plant therefor, the engine and mud pumps being mounted on a common mobile support and having a novel form of drive therebetween. Another object is to provide a device of this type in which the hoisting mechanism and engines for driving it are mounted on a common mobile support, and wherein a cross compound drive is provided so that the power of the pump driving engines and the power of the hoist driving engines may be compounded as needed either for driving the pumps or for driving the hoist mechanism.

Another object of the present invention is to provide a novel form of power take-off mechanism for connecting a hoist drive mechanism to a pump drive mechanism.

A more detailed object is to provide a power plant for well drilling rig in which the mud pumps are mounted at a low elevation, the hoist mechanism mounted at a high elevation and wherein the pump driving engines and the hoist driving engines are all mounted at an intermediate height and connected by a power compounding drive.

Other and more detailed objects and advantages of this invention will appear hereinafter.

In the drawings:

FIGURE 1 is a top plan view showing a preferred embodiment of this invention in diagrammatic form.

FIGURE 2 is a side elevation taken substantially on the lines 2—2 as shown in FIGURE 1.

FIGURE 3 is a side elevation taken substantially on the lines 3—3 as shown in FIGURE 1.

FIGURE 4 is a sectional detail taken substantially on the lines 4—4 as shown in FIGURE 1.

Referring to the drawings, a first mobile support 10 in the form of a trailer carries a pair of power driven positive displacement mud pumps 11 and 12 extending longitudinally of the trailer. Two duplicate internal combustion engine units 13 and 14 are mounted on the same trailer and extend transversely thereof. As shown in FIGURE 3, the mud pumps 11 and 12 are mounted at a low elevation for a maximum suction efficiency and the engine units 13 and 14 are mounted at a higher elevation.

The engine unit 13 drives sprockets 15 and 16 through clutch 17 and the engine unit 14 drives sprocket 18 through clutch 19. Each of these clutches 17 and 19 comprises an air operated friction clutch. The sprockets 15 and 18 are connected by chain 20.

A countershaft assembly generally designated 22 includes a first shaft section 23 mounted in spaced bearings 24 and a second shaft section 25 mounted in spaced bearings 26. A sprocket 27 on the first shaft section 23 is connected by chain 28 to the sprocket 16 so that the combined power of the engine units 13 and 14 may be delivered through the sprocket 27 to the countershaft assembly 22.

A driving sprocket 30 which may be connected by clutch 31 to the first shaft section 23 is arranged to drive the mud pump 11 through the driven sprocket 32 and chain 33.

A sprocket 35 mounted on the second shaft section 25 may be connected thereto by means of the clutch 36 for driving the mud pump 12 through chain 37 and driven sprocket 38. The first shaft section 23 is connected to the second shaft section 25 by means of the air operated friction clutch 40, which clutch may be mounted in the manner shown in the Picard Patent No. 2,610,026. This clutch 40 may be provided with a positive interlock to prevent slippage, or may comprise a dental type clutch, in the event a phase relationship is to be preserved between the positive displacement pumps 11 and 12, as taught in the Herrington Patent No. 2,925,039. A universal joint assembly generally designated 42 is mounted on an overhanging end of the shaft section 25 remote from the position of the friction clutch 40 and serves to connect the shaft section 25 to the torque tube 43.

From this description it will be understood that either or both engine units 13 and 14 may be used to drive either or both of the mud pumps 11 and 12 by suitable actuation of the air clutches 17, 19 and 40 and the positive clutches 31 and 35.

Another mobile support 50 which may take the form of a trailer carries the hoisting assembly generally designated 51 and also carries a pair of duplicate internal combustion engine units 52 and 53 mounted transversely of the trailer. These engine units 52 and 53 are each duplicates of the engine units 13 and 14 and are mounted at substantially the same elevation. Each of the four engines is preferably provided with a torque converter 29 through which it delivers its power. The engine unit 52 drives through air clutch 54 to turn sprocket 55. Similarly, engine unit 53 drives through air clutch 56 to turn sprocket 57 fixed on shaft 58. A jack shaft 59 is mounted between the sprockets 55 and 57. Sprocket 60 is fixed to the jack shaft 59 and connected to sprocket 55 by chain 61. Sprocket 62 is connected to jack shaft 59 by means of clutch 63 and is connected by chain 64 to sprocket 57. From this description it will be understood that the combined power of the engine units 52 and 53 may be applied to jack shaft 59 by closing the positive clutch 63 and by closing the air operated friction clutches 54 and 56.

A power talke-off shaft 70 is driven by chain and sprocket drive 71 or chain and sprocket drive 71a from the shaft 58 and this power take-off shaft 70 is provided with sprocket 72 fixed thereon and arranged to drive the sprocket 73 by means of chain 74. The sprocket 73 is fixed on rear shaft 75 of the hoist assembly 51 and is adapted to drive the cable spooling drum 76 by means of the driving connections 77 or 78, 79, 80 and 81. The usual rotary machine 21 may be operated by chain from the power take-off sprocket 82 which is driven by power transmission connection 83.

From this description it will be understood that the engine units 52 and 53 may be employed to drive the hoist assembly 51 or rotary machine through power take-off sprocket 82. As shown in FIGURE 2, the hoist assembly 51 is positioned at a high elevation with respect to the engine units 52 and 53. This construction enables the hoisting unit to be mounted at the level of the derrick floor (not shown), and it is desirable that this level be considerably above the level of the ground in order to provide room below the derrick floor for blowup preventers, master gate valve, mud return piping, etc., as will be understood by those skilled in the art.

The torque tube 43 which is connected at one end to the universal joint 42 is connected at the other end to a similar universal joint 84. The universal joint 84 is in turn connected to the flange 85 of the air operated friction clutch assembly, generally designated 86. This assembly 86 includes a housing 87 keyed to the jack shaft 59. It also includes the flange member 85 which is supported by means of bearings 88 on the jack shaft 59. The air operated parts of the clutch assembly 86 may be similar to those disclosed in said Picard Patent 2,710,087. When these parts are actuated to establish a driving connection between the parts 85 and 87, the effect is to connect the jack shaft 59 to the universal joint 42.

During drilling operations, when the bit is "on bottom" and while the rotary machine is turning the drill string (not shown), the engine units 13 and 14 normally drive the mud pumps 11 and 12 to deliver mud fluid through the drill string to the bit in the conventional manner. Either engine unit may drive either mud pump, and the power of both engine units 13 and 14 may be applied to drive either mud pump 11 or 12 as desired. The rotary machine 21 is driven from sprocket 82 by means of engine units 52 and 53. When the drill string is to be withdrawn from the hole in order to change the bit, the power to the mud pumps 11 and 12 is cut off by opening the air clutches 17 and 19. The positive clutches 31 and 36 may then be opened to disconnect the mud pumps 11 and 12 from their respective shaft sections 23 and 25. The combined power of the engine units 13 and 14 is then available through the countershaft assembly 22 including the air operated friction clutch 40 to drive through the torque tube 43 to supplement the power of the engine units 52 and 53. In this way the power of all four engine units may be applied to the hoist mechanism 51 and to the spooling drum 76 for maximum power in hoisting the drill string out of the hole. Moreover, this torque tube 43 may be used to enable the engine unit 52 to drive either or both mud pumps 11 and 12, or to supplement the combined power of engine units 13 and 14 in driving the mud pumps, while engine unit 53 is employed to drive the rotary machine through power take off sprocket 82. Any one of the engine units 13, 14, 52 and 53 may be shut down for repairs while the other three engines supply the necessary power for operating the components of the drilling rig.

Having fully described my invention, it is to be understood that I am not to be limited to the details herein set forth, but that my invention is of the full scope of the appended claims.

I claim:

1. In a multiple engine power plant for a drilling rig having a pair of mud pumps and a driven mechanism, the combination of: a mobile support carrying the mud pumps, a pair of engine units mounted on said mobile support, a countershaft assembly mounted on said mobile support and located between the engine units and the mud pumps, means connecting said countershaft assembly to receive power from said engine units, means including a clutch for driving one of the mud pumps from said countershaft assembly, means including a clutch for driving the other mud pump from said countershaft assembly, a second mobile support carrying the driven mechanism, a shaft extending between said mobile supports, a universal joint connecting one end of the shaft to said countershaft assembly, and means including a universal joint operatively connecting said shaft to drive the driven mechanism.

2. In a multiple engine power plant for a drilling rig having a pair of mud pumps and a driven mechanism, the combination of: a mobile support carrying the mud pumps, a pair of engine units mounted on said mobile support, a countershaft assembly mounted on said mobile support and located between the engine units and the mud pumps, said countershaft assembly including a first shaft section operatively connected to receive power from said engine units, means including a clutch for driving one of the mud pumps from said first shaft section, said countershaft assembly including a second shaft section axially aligned with the first shaft section, means including a clutch for driving the other mud pump from said second shaft section, clutch means for connecting said shaft sections, a second mobile support carrying the driven mechanism, a shaft extending between said mobile supports, a universal joint connecting one end of the shaft to said second shaft section, and means including a universal joint operatively connecting said shaft to said driven mechanism.

3. In a multiple engine power plant for a drilling rig having a hoist mechanism and a pair of mud pumps, the combination of: a mobile support carrying the mud pumps, a pair of engine units mounted on said mobile support, a countershaft assembly mounted on said mobile support and located between the engine units and the mud pumps, means connecting said countershaft assembly to receive power from said engine units, means including a clutch for driving one of the mud pumps from said countershaft assembly, means including a clutch for driving the other mud pump from said countershaft assembly, a second mobile support carrying the hoist mechanism, a pair of engine units mounted on said second mobile support, power transmission means whereby the latter said engine units may drive the hoist mechanism, said power transmission means including a rotary member, and means including a shaft extending between said mobile supports and connected to said rotary member and to said countershaft assembly whereby all of said engine units may be employed in conjoint operation to drive said hoist mechanism.

4. In a multiple engine power plant for a drilling rig having a pair of mud pumps and a hoist mechanism, the combination of: a mobile support carrying the mud pumps, a pair of engine units mounted on said mobile support, a countershaft assembly mounted on said mobile support and located between the engine units and the mud pumps, said countershaft assembly including a first shaft section operatively connected to receive power from said engine units, means including a clutch for driving one of the mud pumps from said first shaft section, said countershaft assembly including a second shaft section axially aligned with the first shaft section, means including a clutch for driving the other mud pump from said second shaft section, clutch means for connecting said shaft sections, a second mobile support carrying the hoist mechanism, a pair of engine units mounted on said second mobile support, power transmission means whereby said engine units may drive the hoist mechanism, said power transmission means including a rotary member, a shaft extending between said mobile supports, a universal joint connecting one end of the shaft to said second shaft section, and a universal joint connecting said shaft to said rotary member, whereby all of said engine units may be employed in conjoint operation to drive said hoist mechanism.

5. In a multiple engine power plant for a drilling rig having a hoist mechanism and a pair of mud pumps, the combination of: a mobile support carrying the mud pumps at a low elevation, a pair of engine units mounted on said mobile support at an intermediate elevation, a countershaft assembly mounted on said mobile support and located between the engine units and the mud pumps, means connecting said countershaft assembly to receive power from said engine units, means including a clutch for driving one of the mud pumps from said countershaft assembly, means including a clutch for driving the other mud pump from said countershaft assembly, a second mobile support carrying the hoist mechanism at a high elevation, a pair of engine units mounted on said second mobile support at about the same elevation as the first said engine units, power transmission means whereby the latter said engine units may drive the hoist mechanism, said power transmission means including a rotary member, and means including a shaft extending between said mobile supports and connected to said rotary member and to said countershaft assembly whereby all of said engine units may be employed in conjoint operation to drive said hoist mechanism.

6. In a multiple engine power plant for a drilling rig having a hoist mechanism and a pair of mud pumps, the combination of: a mobile support carrying the mud pumps, a pair of engine units mounted on said mobile support, means including a countershaft assembly mounted on said mobile support whereby the engine units may drive the mud pumps, a second mobile carrying the hoist mechanism, a pair of engine units mounted on said second mobile support, power transmission means whereby the latter said engine units may drive the hoist mechanism, said power transmission means including a jackshaft, a rotary member rotatably mounted at one end of the said jackshaft, clutch means for connecting said rotary member to said jackshaft, and means including a shaft extending between said mobile supports and connected to said rotary member and to said countershaft assembly, whereby all of said engine units may be employed in conjoint operation to drive said hoist mechanism.

7. In a multiple engine power plant for a drilling rig having a hoist mechanism and at least one mud pump, the combination of: a mobile support bearing the mud pump, an engine unit mounted on said mobile support, a countershaft assembly mounted on said mobile support and located between the engine unit and the mud pump, means connecting said countershaft assembly to receive power from said engine unit, means including a clutch for driving the mud pump from said countershaft assembly, a second mobile support carrying the hoist mechanism, an engine unit mounted on said second mobile support, power transmission means whereby the latter said engine unit may drive the hoist mechanism, said power transmission means including a rotary member, and means including a shaft extending between said mobile supports and connected to said rotary member and to said countershaft assembly, whereby both of said engine units may be employed in conjoint operation to drive said hoist mechanism.

8. In a multiple engine power plant for a drilling rig having a hoist mechanism and at least one mud pump, the combination of: a mobile support bearing the mud pump at a low elevation, an engine unit mounted on said mobile support at an intermediate elevation, a countershaft assembly mounted on said mobile support and located between the engine unit and the mud pump, means connecting said countershaft assembly to receive power from said engine unit, means including a clutch for driving the mud pump from said countershaft assembly, a second mobile support carrying the hoist mechanism at a high elevation, an engine unit mounted on said second mobile support at about the same elevation as the said first engine unit, power transmission means whereby the latter said engine unit may drive the hoist mechanism, said power transmission means including a rotary member, and means including a shaft extending between said mobile supports and connected to said rotary member at said countershaft assembly whereby both of said engine units may be employed in conjoint operation to drive said hoist mechanism.

9. In a multiple engine power plant for driving a drilling rig having a hoist mechanism and at least one mud pump, the combination of: a mobile support bearing the mud pump, an engine unit mounted on said mobile support, means including a countershaft assembly mounted on said mobile support whereby the engine unit may drive the mud pump, a second mobile support carrying the hoist mechanism, an engine unit mounted on said second mobile support, power transmission means whereby the latter said engine unit may drive the hoist mechanism, said power transmission means including a jackshaft, a rotatable member rotatably mounted at one end of said jackshaft, clutch means for connecting said rotary member to said jackshaft, and means including a shaft extending between said mobile supports and connected to said rotary member and to said countershaft assembly, whereby both of said engine units may be employed in conjoint operation to drive said hoist mechanism.

References Cited in the file of this patent

UNITED STATES PATENTS

| | | |
|---|---|---|
| 1,825,087 | Park | Sept. 29, 1931 |
| 2,171,994 | Riise | Sept. 5, 1939 |
| 2,610,026 | Picard | Sept. 9, 1952 |
| 2,834,575 | Hughes | May 13, 1958 |